(12) United States Patent
Folkenberg et al.

(10) Patent No.: US 8,628,763 B2
(45) Date of Patent: Jan. 14, 2014

(54) OF GROWTH OF BIFIDOBACTERIA IN FERMENTED MILK PRODUCTS

(75) Inventors: Ditte Marie Folkenberg, Hilleroed (DK); Cecile Seimandi, St Germain (FR)

(73) Assignee: CHR-Hansen A/S, Hoersholm (DK)

( * ) Notice: Subject to any disclaimer, the term of this patent is extended or adjusted under 35 U.S.C. 154(b) by 117 days.

(21) Appl. No.: 13/057,461

(22) PCT Filed: Aug. 28, 2009

(86) PCT No.: PCT/EP2009/061164
§ 371 (c)(1),
(2), (4) Date: Apr. 29, 2011

(87) PCT Pub. No.: WO2010/023290
PCT Pub. Date: Mar. 4, 2010

(65) Prior Publication Data
US 2011/0200709 A1 Aug. 18, 2011

(30) Foreign Application Priority Data

Aug. 29, 2008 (DK) .............................. 2008 01193
Nov. 26, 2008 (EP) .................................. 08170004

(51) Int. Cl.
*A01N 63/00* (2006.01)
(52) U.S. Cl.
USPC .................... 424/93.4; 424/93.44; 424/93.45; 424/535; 426/43; 426/61; 426/580; 426/583; 435/252.1
(58) Field of Classification Search
USPC ............................ 424/93.4, 93.44, 93.45, 535
See application file for complete search history.

(56) References Cited

U.S. PATENT DOCUMENTS

| | | |
|---|---|---|
| 4,187,321 A | 2/1980 | Mutai et al. |
| 4,588,595 A | 5/1986 | Okonogi et al. |
| 4,913,913 A | 4/1990 | Takano et al. |
| 5,230,912 A | 7/1993 | Yajima et al. |
| 5,895,648 A | 4/1999 | Cavaliere Vesely et al. |
| 2002/0081712 A1 | 6/2002 | Kringelum et al. |
| 2005/0031735 A1 | 2/2005 | Serata et al. |
| 2008/0227177 A1 | 9/2008 | Mollgaard et al. |
| 2009/0035416 A1 | 2/2009 | Shimizu et al. |
| 2010/0272854 A1* | 10/2010 | Terragno et al. .................. 426/8 |
| 2011/0200709 A1 | 8/2011 | Folkenberg et al. |

FOREIGN PATENT DOCUMENTS

| | | |
|---|---|---|
| AU | 2007333619 B2 | 11/2007 |
| EP | 0 111 392 A3 | 11/1983 |
| EP | 0 974 268 B1 | 2/2004 |
| EP | 1 989 942 A1 | 11/2008 |
| WO | WO 98/54337 | 12/1998 |
| WO | WO 2006/133718 A1 | 12/2006 |
| WO | WO 2008040872 A2 * | 4/2008 |
| WO | WO 2008/099543 A1 | 8/2008 |
| WO | WO 2008/148561 A1 | 12/2008 |

OTHER PUBLICATIONS

Bernbom, Nete et al. Effects of *Lactococcus lactis* on Composition of Intestinal Microbiota: Role of Nisin. Applied and Environmental Microbiology, Jan. 2006. vol. 72, No. 1. pp. 239-244.*
International Search Report PCT/EP2009/061164 dated Nov. 18, 2010.
A.B. Martin-Diana et al., "Development of a fermented goat's milk containing probiotic bacteria", International Dairy Journal, 13, (2003) 827-833.
M. Saxelin et al., "The technology of probiotics", Trends in Food Science and Technology 10, (1999) 387-392.

* cited by examiner

*Primary Examiner* — Susan Hanley
*Assistant Examiner* — Nghi Nguyen
(74) *Attorney, Agent, or Firm* — Foley & Lardner LLP

(57) ABSTRACT

The present invention relates to a method for the preparation of a fermented milk product comprising Bifidobacteria in combination with lactic acid bacteria of the species *Lactococcus lactis, Sterptococcus thermophilus*, and/or *Lactobacillus bulgaricus*. The problem to be solved is to provide a method to improve growth of Bifidobacteria population in milk during the fermentation process for making fermented milk products (e.g. a yogurt) in order to obtain a high cell count of Bifidobacteria in the final product.

18 Claims, No Drawings

US 8,628,763 B2

OF GROWTH OF BIFIDOBACTERIA IN FERMENTED MILK PRODUCTS

CROSS-REFERENCE TO RELATED APPLICATIONS

This application is the U.S. National Phase of PCT/EP2009/061164 filed Aug. 28, 2009, which claims priority from Denmark Application No. PA 2008 01193 filed Aug. 29, 2008 and European Application No. 08170004.9 dated Nov. 26, 2008. The subject matter of each of the above-referenced applications is incorporated in entirety by reference.

FIELD OF INVENTION

The present invention relates to the improvement of growth of Bifidobacteria by selected bacterial strains in fermented milk products.

BACKGROUND OF INVENTION

Dairy products and specifically yogurt-like products form the largest segment by far of the market of probiotic products. Dairy products are excellent vehicles for delivering useful probiotic bacteria such as Bifidobacteria and introducing them into the gastrointestinal tract.

The *Bifidobacterium* BB-12® is a well known probiotic bacterium, obtainable from Chr. Hansen A/S, Hørsholm, DK. In the case of BB-12® the available clinical evidence indicates that a daily dosis of at least $10^9$-$10^{10}$ cfu viable probiotic bacteria is required (cfu/CFU is short for cell forming units). Accordingly, it is desirable to have a high level of e.g. $10^8$ cfu viable cells of probiotic bacteria per gram fermented milk product (e.g. a fermented milk yogurt product).

SUMMARY OF INVENTION

The problem to be solved by the present invention is to provide a method to improve growth of Bifidobacteria population in milk during the fermentation process for making fermented milk products (e.g. a yogurt) in order to obtain a high cell count of Bifidobacteria in the final product.

The solution is based on the surprising finding of the present inventors that specific *Lactococcus lactis* strains significantly improve the growth of Bifidobacteria during fermentation of the milk. By using one of these strains the resulting fermented milk product contains more than $10^8$ cfu/g Bifidobacteria (directly after the fermentation). Consequently, it is not necessary to add extra Bifidobacteria after the fermentation is terminated to obtain a product with e.g. $10^8$ cfu/g Bifidobacteria. The inventors tested a series of different *Lactococcus lactis* strains and found that the strains identified as *Lactococcus lactis* CHCC3912 and CHCC4462 and deposited under DSM21406 respectively DSM21408 significantly improve the growth of Bifidobacteria during the milk fermentation. As a matter of fact, some other strains of *Lactococcus lactis* influenced the growth of Bifidobacteria negatively.

In addition, the inventors observed that a strain of *Streptococcus thermophilus* (CHCC7018) has a unique characteristic in that the strain also improves growth of Bifidobacteria.

Accordingly, an aspect of the invention relates to a method for preparation of a fermented milk product, such as a product comprising at least $10^8$ cfu Bifidobacteria per gram fermented milk product, wherein the method comprises:

i) inoculating milk with a culture (such as a yogurt culture) comprising at least one *Lactococcus lactis*, at least one *Streptococcus thermophilus* strain, at least one *Bifidobacterium* strain and optionally at least one *Lactobacillus bulgaricus* strain, wherein one of said *Lactococcus lactis* strain is preferably selected from the group consisting of: *Lactococcus lactis* strain CHCC3912 (DSM21406), a mutant of CHCC3912 and a variant of CHCC3912; or CHCC4462 (DSM21407), a mutant of CHCC4462 and a variant of CHCC4462;

ii) fermenting the milk under suitable conditions; and iii) optionally packaging a suitable amount of the fermented milk product in a suitable package. An interesting embodiment relates to a method for preparation of a fermented milk product comprising at least $10^8$ cfu Bifidobacteria per gram fermented milk product wherein the method comprises:

i) inoculating milk with a yogurt culture comprising at least one *Lactobacillus bulgaricus* strain, at least one *Streptococcus thermophilus* strain, at least one *Lactococcus lactis* strain and at least one *Bifidobacterium* strain, wherein one of said *Lactococcus lactis* strain is one of the *Lactococcus lactis* strains CHCC3912 (DSM21406) or CHCC4462 (DSM21407);

ii) fermenting the milk under suitable conditions to obtain a fermented milk product with at least $10^8$ cfu Bifidobacteria per gram fermented milk; and iii) packaging a suitable amount of the fermented milk product in a suitable package.

Also, the invention relates to the *Streptococcus thermophilus* strain CHCC7018 with accession number DSM21408 and mutants/variants thereof, and to a culture (such as a starter culture) comprising a strain of the invention, optionally together with another strain, such as a *Bifidobacterium* strain (e.g. BB-12®). An interesting composition comprises i) from $10^5$ to $10^{12}$ cfu/g BB-12® and ii) from $10^5$ to $10^{12}$ cfu/g CHCC7018.

DETAILED DISCLOSURE

The present invention relates to, in a first aspect, to a method for preparation of a fermented milk product, which comprises:

i) inoculating milk with a) bacteria belonging to a *Bifidobacterium* strain, and b) bacteria belonging to a strain selected from the group consisting of: a *Lactococcus lactis* strain, preferably a strain that enhances growth of the *Bifidobacterium* strain, such as CHCC4462 (DSM21407), CHCC3912 (DSM21406), a *Streptococcus thermophilus* strain, preferably a strain that enhances growth of the *Bifidobacterium* strain, such as CHCC7018, and a mutant or variant of any of these strains;

ii) fermenting the milk;

iii) optionally adding further microorganisms and/or additives to the fermented milk; and iv) optionally packaging the fermented milk product. In a presently preferred embodiment, step i) further comprises inoculation of the milk with bacteria belonging to a species selected from the group consisting of: *Lactobacillus bulgaricus*, *Streptococcus thermophilus*, *Lactococcus lactis*, and *Lactobacillus acidophilus*.

An embodiment of the method of the invention is a method wherein step i) comprises inoculating milk with a culture comprising a) a *Bifidobacterium* strain;

b) a *Lactobacillus bulgaricus* strain;

c) a *Lactococcus lactis* strain selected from the group consisting of: CHCC4462, a mutant of CHCC4462, a variant of CHCC4462, CHCC3912, a mutant of CHCC3912, and a variant of CHCC3912; and/or a *Streptococcus thermophilus* strain selected from the group consisting of: CHCC7018, a mutant of CHCC7018 and a variant of CHCC7018.

Another embodiment relates to a method for preparation of a fermented milk product, such as a product comprising at least $10^8$ cfu Bifidobacteria per gram fermented milk product, wherein the method comprises:

i) inoculating milk with a culture (such as a yogurt culture) comprising at least one *Lactococcus lactis* strain and at least one *Bifidobacterium* strain and optionally at least one *Streptococcus thermophilus* strain and at least one *Lactobacillus bulgaricus* strain, wherein one of said *Lactococcus lactis* strain is selected from the group consisting of: *Lactococcus lactis* strain CHCC3912 with accession number DSM21406, a mutant of CHCC3912, and a variant of CHCC3912 or CHCC4462 with accession number DSM21407, a mutant of CHCC4462 and a variant of CHCC4462;

ii) fermenting the milk under suitable conditions; and iii) optionally packaging a suitable amount of the fermented milk product in a suitable package.

Yet another embodiment relates to a method for preparation of a fermented milk product comprising at least $10^8$ cfu Bifidobacteria per gram fermented milk product wherein the method comprises:

i) inoculating milk with a yogurt culture comprising at least one *Lactobacillus bulgaricus* strain, at least one *Streptococcus thermophilus* strain, at least one *Lactococcus lactis* strain and at least one *Bifidobacterium* strain, wherein one of said *Lactococcus lactis* strain is *Lactococcus lactis* strain CHCC3912 with accession number DSM21406 or *Lactococcus lactis* strain CHCC4462 with accession number DSM21407;

ii) fermenting the milk under suitable conditions to obtain a fermented milk product with at least $10^8$ cfu Bifidobacteria per gram fermented milk; and iii) packaging a suitable amount of the fermented milk product in a suitable package.

In an embodiment, the method of the invention further comprises inoculating the milk with an additional *Streptococcus thermophilus* strain, preferably a texturizing strain, such as a strain selected from the group consisting of: ST-BODY-3 (Chr. Hansen A/S, Hørsholm, DK) and ST8833 (DSM17876).

The *Bifidobacterium* stain preferably belongs to a species selected from the group consisting of *Bifidobacterium adolescentis, Bifidobacterium animalis, Bifidobacterium asteroids, Bifidobacterium bifidum, Bifidobacterium breve, Bifidobacterium catenulatum, Bifidobacterium infantis, Bifidobacterium lactis, Bifidobacterium longum* and *Bifidobacterium pseudocatenulatum*, and it is presently preferred that the *Bifidobacterium* strain is a strain of *Bifidobacterium animalis* subspecies *lactis*. Examples of strains are strains selected from the group consisting of CHCC5445 (BB-12®) with accession number DSM15954, CHCC7158 (HNO19, deposit number DSM17280), *Bifidobacterium* strain deposited as ATCC 27536, *Bifidobacterium infantis* strain Bbi99 (DSM 13692), BB-420, BI-04, CHCC2037, LAFTI B-94, DN 173 010, STB-2938, R0071, R0175, and BB-46™ (DSM15955), and a mutant/variant of any of these strains.

In a useful embodiment, the obtained fermented milk product contains at least $10^8$ cfu Bifidobacteria per gram fermented milk product at end of fermentation, and/or the fermented milk product contains at least $10^8$ cfu/g Bifidobacteria after 28 days of storage at +6° C.

According to an important embodiment of the present method, the milk in step i) is inoculated with $10^5$ to $3 \times 10^7$ cfu/g of the *Bifidobacterium* and/or with $10^4$ to $3.5 \times 10^6$ cfu/g of the *Streptococcus thermophilus* or *Lactococcus lactis* bacteria. The milk may be inoculated simultaneously with the bacterial species. This is conveniently done by inoculating the milk with a starter culture comprising both bacterial species.

In yet an embodiment, the milk is further inoculated with at least one bacterial strain, such as a *Lactococcus lactis* subs. *lactis* strain (e.g. selected from the group consisting of *Lactococcus lactis* subs. *lactis* DN224; *Lactococcus lactis* subs. *lactis* DN223; and a mutant or variant strain of any of these). It is presently preferred that this extra helper organism is a *Lactococcus lactis* subs. *lactis* strain selected from the group consisting of *Lactococcus lactis* subs. *lactis* DN224, *Lactococcus lactis* subs. *lactis* DN223.

It should be understood that the milk may be inoculated separately/sequential with each bacterial species, or simultaneously with two or more the bacterial species. It is presently preferred that the milk is inoculated with all bacterial species at the same time. This is conveniently done by inoculating the milk with a starter culture comprising the bacterial species.

A product obtained by the present method of the invention may be defined as "yogurt", i.e. when the milk in inoculated with both a *Lactobacillus bulgaricus* strain and a *Streptococcus thermophilus* strain.

The fermented milk product (such as the yogurt) is conveniently packaged in a sealed package that contains from 10-5000 ml of the product, such as from 25 to 3000 ml or from 50 to 1000 ml. Exemplary packages may contain 10-300 ml, 20-200 ml or 30-100 ml.

In a second aspect, the invention relates to a culture comprising:

a) bacteria belonging to a *Bifidobacterium* strain, such as CHCC5445 (BB-12®), and b) bacteria belonging to a strain selected from the group consisting of: a *Lactococcus lactis* strain, preferably a strain that enhances growth of the *Bifidobacterium* strain, such as CHCC4462, CHCC3912, and a *Streptococcus thermophilus* strain, preferably a strain that enhances growth of the *Bifidobacterium* strain (such as CHCC7018), or a mutant or variant of any of these strains.

The invention also relates to a culture (such as a starter culture) comprising from $10^5$ to $10^{12}$ cfu/g BB-12®, and from $10^5$ to $10^{12}$ cfu/g CHCC7018 and/or from $10^5$ to $10^{12}$ cfu/g of *Lactococcus lactis* CHCC3912 or CHCC4462. The culture may further comprise from $10^5$ to $10^{12}$ cfu/g of DN224 or DN223.

A further aspect of the present invention relates to a fermented milk product obtainable by the method of the invention, especially to a fermented milk product comprising a *Streptococcus thermophilus* strain selected from the group consisting of CHCC7018 (DSM21408); a mutant of CHCC7018; and a variant of CHCC7018. It is presently preferred that the fermented milk product of the invention comprises $10^3$ to $10^{10}$ cfu/g of the *Streptococcus thermophilus* strain.

The invention also relates to a fermented milk product comprising bacteria belonging to a strain selected from the group consisting of: CHCC4462, and CHCC3912, and a mutant or variant of any of these strains. The fermented milk product comprises preferably $10^3$, preferably at least $10^5$, cfu/g of the bacterial strain.

The fermented milk product of the present invention may further comprise $10^3$ to $10^{10}$ cfu/g of Bifidobacteria and/or from $10^3$ to $10^{10}$ cfu/g of a *Lactococcus lactis* strain (such as CHCC3912, CHCC4462, DN224 or DN223). In presently preferred embodiment, the fermented milk product comprises at least $10^5$, preferably at least $10^7$, cfu/g of Bifidobacteria and/or at least $10^5$, preferably at least $10^7$, cfu/g of a *Lactococcus lactis* subs. *lactis* train.

In a further aspect, the present invention relates to a bacterial strain selected from the group consisting of CHCC7018, a mutant of CHCC7018, a variant of CHCC7018, CHCC4462, a mutant of CHCC4462, a variant of CHCC4462, CHCC3912, a mutant of CHCC3912, and a variant of CHCC3912. Preferred is a mutant/variant strain which has one or more (preferably, all) of the characteristics of the mother strain, e.g. the mutant/variant strain is able to promote the growth of a *Bifidobacterium* strain (esp. BB-12®). The strain may be in isolated form, e.g. substantially free of other bacterial strains.

In a preferred embodiment the *Bifidobacterium* is at least one *Bifidobacterium* selected from the group consisting of *Bifidobacterium adolescentis*, *Bifidobacterium animalis*, *Bifidobacterium asteroids*, *Bifidobacterium bifidum*, *Bifidobacterium breve*, *Bifidobacterium catenulatum*, *Bifidobacterium infantis*, *Bifidobacterium lactis*, *Bifidobacterium longum* and *Bifidobacterium pseudocatenulatum*. A mixture comprising two or more of these listed strains may also be used.

In the preferred embodiment of the method the *Bifidobacterium* strain is a strain of *Bifidobacterium animalis* subspecies *lactis*. In particular, wherein the strain is *Bifidobacterium animalis* subspecies *lactis* strain BB-12® (CHCC5445) deposited under accession number DSM15954.

Another preferred *Bifidobacterium animalis* subspecies *lactis* strain is strain HN019 (also known as DR-10™ or HOWARU™). The strain was isolated from a commercial available infant formula product labeled Fernleaf DR-10 bifidus that was sold in Taiwan during 2000. It has the accession number CHCC7158 in the Hansen culture collection and is deposited with DSMZ under accession number DSM17280.

Measuring the Bifidobacteria cfu/g cell count is done by quantifying the number of Colony Forming Units (cfu) in serial dilutions of the fermented product by colony counting on agar plates, according to standard methods in the art. Suitable medium and incubation are as given below:

Medium: MRS (de Man et al. 1960. J. Appl. Bacteriol. 23:130) no acid+1% dicloxacilline (SIGMA D-9016)+1% cystein (MERCK n° 2839); and
Incubation: 3 days at 37° C. in anaerobic conditions As discussed herein use of CHCC3912 or CHCC4462 (and/or CHCC7018) provides the possibility of obtaining more than $10^8$ cfu/g Bifidobacteria directly from the growth of Bifidobacteria during the fermentation. Accordingly, the at least $10^8$ cfu/g Bifidobacteria of step ii) of the first aspect relates to the cfu/g Bifidobacteria obtained directly after fermentation.

As shown in the working examples, the *Bifidobacterium* BB-12® has a good survival rate when grown together with *Lactococcus lactis* strain CHCC3912 or CHCC4462 and/or *Streptococcus thermophilus* strain CHCC7018.

Accordingly, in a preferred embodiment, the fermented milk product has at least $10^8$ cfu/g Bifidobacteria after 1 day of storage at +6° C., more preferred at least $10^8$ cfu/g Bifidobacteria after 7 days of storage at +6° C., even more preferred at least $10^8$ cfu/g Bifidobacteria after 14 days of storage at +6° C., even more preferred at least $10^8$ cfu/g Bifidobacteria after 21 days of storage at +6° C. and most preferred at least $10^8$ cfu/g Bifidobacteria after 28 days of storage at +6° C.

The skilled person knows suitable fermenting conditions to ferment milk with the herein relevant bacteria.

Suitable conditions are e.g. where the milk is inoculated with the bacteria and fermented at 38° C. to 43° C. with the optimum at 40° C., until reaching a pH of 4.4 to 4.6 (roughly after around 8 hours).

Cooling the milk to +6° C. stops the fermentation and growth of herein relevant bacteria such as Bifidobacteria.

In a preferred embodiment the herein described improved growth is obtained by inoculating from $10^5$ to $3\times10^7$ cfu/g of *Bifidobacterium*; and by inoculating simultaneously *Lactococcus lactis* strain CHCC3912 or CHCC4462 and/or *Streptococcus thermophilus* strain CHCC7018 in a concentration from $10^4$ to $3.5\times10^6$ cfu/g.

If desired, one may add extra bacteria (e.g. extra *Bifidobacterium*) at some point of interest (e.g. after the completion of the fermentation).

As known to the skilled person various different fermented milk products can be obtained by fermentation of milk, and may be in liquid or solid form. In a preferred embodiment the fermented milk product is a product selected from the group consisting of yogurt, drinking yogurt, stirred yogurt, set yogurt and a yogurt like drink, bitter milk, butter milk, sour cream, fresh cheese and cheese.

Fermented milk comprising at least $10^8$ cfu/g Bifidobacteria as described herein can also be used as a product additive to e.g. put into other edible food products such as curd cheeses, chocolates, juices, meat products and dried milk powder products for young infants.

In the present context the *Lactobacillus bulgaricus* may be any suitable (e.g. commercially available) *Lactobacillus bulgaricus* strain. As known to the skilled person, it may be inoculated in adequate amounts to obtain an adequate amount of *Lactobacillus bulgaricus* in the final fermented milk product.

In the method of the invention other bacteria of interest, such as a helper bacterium, may be added. Such bacteria may be added during the fermentation or after the fermentation as such has ended. Examples of such additional bacteria include a bacterium selected from the list consisting of *Lactococcus* and *Lactobacillus*. A preferred *Lactobacillus* is *Lactobacillus acidophilus* strain LA-5® (commercially available from Chr. Hansen A/S, Denmark). As described in WO98/54337 (Chr. Hansen, granted as EP0985043 B1) a lactic acid helper bacterium that is defective in its pyruvate metabolism may be added during the fermentation to get a number of improvements, including improving the shelf life of the bacteria. The strains DN224 (deposited as DSM 11037) and DN223 (deposited as DSM 11036), which are defective in their pyruvate metabolisms, are described as examples of suitable bacterial helper organisms. Accordingly, in an embodiment of the present invention, a lactic acid bacterial helper organism that is defective in its pyruvate metabolism is also added to the milk in order to be fermented as described herein. In a preferred embodiment the lactic acid bacterial helper organism is a bacterium selected from the group consisting of *Lactococcus lactis* subspecies lactis strain DN223 deposited under the accession No. DSM 11036 and *Lactococcus lactis* subspecies lactis strain DN224 (deposited under No. DSM 11037). Most preferably, the lactic acid bacterial helper organism is DN224.

An embodiment relates to a composition, such as a culture, comprising:
i) from $10^5$ to $10^{12}$ cfu/g BB-12® and
ii) from $10^5$ to $10^{12}$ cfu/g CHCC7018.
iii) from $10^5$ to $10^{12}$ cfu/g of DN224.

Deposited Microbial Organisms [EXPERT SOLUTION]

The strains *Lactococcus lactis* CHCC3912, *Lactococcus lactis* CHCC4462, *Lactococcus lactis* CHCC2907, and *Streptococcus thermophilus* strain CHCC7018 have been deposited at DSMZ (Deutsche Sammlung von Mikroorganismen and Zellkulturen GmbH, Inhoffenstr. 7B, D-38124 Braunschweig, Germany) under the accession numbers DSM21406, DSM21407, DSM21421, and DSM 21408, respectively, with a deposit date of 23 Apr. 2008. The deposits have been made under the conditions of the Budapest Treaty on the International Recognition of the Deposit of Microorganisms for the Purposes of Patent Procedure.

The Applicant requests that a sample of the deposited microorganisms should be made available only to an expert approved by the Applicant.

DEFINITIONS

In the present context, a yoghurt starter culture is a bacterial culture which comprises at least one *Lactobacillus bulgaricus* strain and at least one *Streptococcus thermophilus* strain. In accordance herewith, a yogurt is a fermented milk product obtainable by inoculating and fermenting milk with a *Lactobacillus bulgaricus* strain and a *Streptococcus thermophilus* strain.

In the present context, the term "milk" comprises milk of a mammal or a plant. Examples on milk are cow's milk (bovine milk), camel milk, buffalo milk, goat's milk, sheep's milk, and soy milk. Optionally the milk is acidified, e.g. by addition of an acid (such as citric, acetic or lactic acid), or mixed, e.g. with water. The milk may be raw or processed, e.g. by filtering, sterilizing, pasteurizing, homogenizing etc, or it may be reconstituted dried milk. An important example of "bovine milk" according to the present invention is pasteurized cow's milk. It is understood that the milk may be acidified, mixed or processed before, during and/or after the inoculation with bacteria.

In the present context, the term "packaging" (a suitable amount of) the fermented milk in a suitable package relates to the final packaging of the fermented milk to obtain a product that can be ingested by e.g. a person or a group of persons. A suitable package may thus be a bottle or similar, and a suitable amount may be e.g. 10 ml to 5000 ml, but it is presently preferred that the amount in a package is from 50 ml to 1000 ml.

In the present context, the term "mutant" should be understood as a strain derived from a strain of the invention (or used in the invention) by means of e.g. genetic engineering, radiation and/or chemical treatment. It is preferred that the mutant is a functionally equivalent mutant. A preferred mutant of a strain of the invention is a mutant that enhances the growth of a *Bifidobacterium* cell in a milk medium, e.g. a mutant that has substantially the same, or improved, *Bifidobacterium* growth promoting properties as the mother strain. Such a mutant is a part of the present invention. Especially, the term "mutant" refers to a strain obtained by subjecting a strain (such is a strain of the invention) to any conventionally used mutagenization treatment including treatment with a chemical mutagen such as ethane methane sulphonate (EMS) or N-methyl-N'-nitro-N-nitroguanidine (NTG), UV light or to a spontaneously occurring mutant. A mutant may have been subjected to several mutagenization treatments (a single treatment should be understood as one mutagenisation step followed by a screening/selection step), but it is presently preferred that no more than 20, or no more than 10, or no more than 5, treatments are carried out. In a presently preferred mutant, less that 5%, or less than 1% or even less than 0.1% of the nucleotides in the bacterial genome have been shifted with another nucleotide, or deleted, compared to the mother strain.

In the present context, the term "variant" should be understood as strain which is functionally equivalent to the mother strain, such as a strain that enhances the growth of a *Bifidobacterium* cell in a milk medium. The variant should belong to the same species as the mother strain. For instance, a variant of CHCC7018 should be understood as a *Streptococcus thermophilus* strain which is functionally equivalent to CHCC7018, such as a strain that enhances the growth of a *Bifidobacterium* cell in a milk medium, e.g. has the same or substantially the same, or improved *Bifidobacterium* growth promoting properties as the mother strain, and a variant of CHCC3912 should be understood as a *Lactococcus lactis* strain which is functionally equivalent to CHCC3912, e.g. has the same or substantially the same or improved *Bifidobacterium* growth promoting properties as the mother strain. Such variants, which may be identified using appropriate screening techniques, are a part of the present invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

EXAMPLES

Example 1

Growth Improvement of BB-12® Using Various *Lactococcus lactis* Stains

Milk media (9.5% reconstituted skim milk powder heated to 99 deg C. for 30 sec) was inoculated with 0.01% BB-12® F-DVS culture and 0.01% *Lactococcus* F-DVS culture leading to a start BB-12® concentration of $1 \times 10^7$ CFU. Hereafter the milk was fermented for 16 h at 40 deg. C. and stored at 8 deg. C. BB-12® cell count analyses were performed after respectively 1, 14, 28 and 45 days storage.

TABLE 1

| | *Bifidobacterium* strain: | | | |
|---|---|---|---|---|
| | BB-12 ® | BB-12 ® | BB-12 ® | BB-12 ® |
| *Lactococcus* strain: | None | CHCC4462 | CHCC3912 | CHCC2907 (HB-3) |
| BB-12 ® CFU inoculation: | $1.0 \times 10^7$ | $1.0 \times 10^7$ | $1.0 \times 10^7$ | $1.0 \times 10^7$ |
| BB-12 ® CFU Day 1: | $2.0 \times 10^5$ | $3.0 \times 10^8$ | $1.3 \times 10^9$ | $1.0 \times 10^5$ |
| BB-12 ® CFU Day 14: | $5.7 \times 10^4$ | $1.5 \times 10^9$ | $1.2 \times 10^9$ | $3.5 \times 10^4$ |
| BB-12 ® CFU Day 28: | $2.0 \times 10^4$ | $1.2 \times 10^8$ | $6.9 \times 10^8$ | |
| BB-12 ® CFU Day 45: | $1.0 \times 10^4$ | $1.3 \times 10^8$ | $7.9 \times 10^8$ | |

Example 2

Growth Improvement of BB-12® Using Various *Streptococcus thermophilus* Stains Milk media (9.5% reconstituted skim milk powder heated to 99 deg C. for 30 sec) was inoculated with 0.01% BB-12® F-DVS culture and 0.01% *Streptococcus thermophilus* F-DVS culture leading to a start BB-12® concentration of $1 \times 10^7$ CFU. Hereafter the milk was fermented for 16 h at 40 deg. C. and stored at 8 deg. C. BB-12® cell count analyses were performed after respectively 1, 14, 28 and 45 days storage.

TABLE 2

| | *Bifidobacterium* strain: | | | |
|---|---|---|---|---|
| | BB-12® | BB-12® | BB-12® | BB-12® |
| *Streptococcus* strain: | none | CHCC7018 | CHCC6592 | CHCC4895 |
| BB-12® CFU inoculation: | $1.0 \times 10^7$ | $1.0 \times 10^7$ | $1.0 \times 10^7$ | $1.0 \times 10^7$ |
| BB-12® CFU Day 1: | $2.0 \times 10^5$ | $4.7 \times 10^7$ | $1.4 \times 10^7$ | $8.1 \times 10^6$ |
| BB-12® CFU Day 14: | $5.7 \times 10^4$ | $8.5 \times 10^7$ | $1.3 \times 10^7$ | $1.3 \times 10^6$ |
| BB-12® CFU Day 28: | $2.0 \times 10^4$ | $8.1 \times 10^7$ | $5.5 \times 10^6$ | |
| BB-12® CFU Day 45: | $1.0 \times 10^4$ | $4.8 \times 10^7$ | $5.4 \times 10^6$ | |

Example 3

Growth Improvement of BB-12® Using *Streptococcus thermophilus* and *Lactococcus lactis* Strains Yoghurt production was done according to standard 3 liter Yoghurt procedure. Fresh milk (0.5% fat) added 2% skimmed milk powder was heat treated 20 min at 92 deg. C. The milk was cooled to 43 deg. C., inoculated with culture (0.016-0.023% depending on culture) and fermented to pH 4.55. Hereafter the yoghurt was stirred, cooled to 25 deg. C. and stored at 5 deg. C.

Results:

Data are average over 3 replicate yoghurt production in 3 L scale (68 'low inoculation' only 2 replicates)

The reference cultures ABY-10 and BY-700 (Chr. Hansen A/S, Hørsholm, DK) which are known to be the best performing cultures concerning BB-12® cell counts in the fermented milk product.

Culture Composition:

"68": culture containing BB-12®, CHCC7018, *Lactobacillus bulgaricus*, and CHCC4462 (*Lactococcus lactis* CHCC4462).

"74": culture containing BB-12®, CHCC7018, *Lactobacillus bulgaricus*, and CHCC3912 (*Lactococcus lactis* CHCC3912).

CONCLUSION

CHCC7018, CHCC4462, and CHCC3912 improve growth of *Bifidobacterium* BB-12® during fermentation to at least $10^8$ cfu/g in fermented milk products, both taken alone and in combination.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCES

1. EP111392B1
2. WO98/54337 (Chr. Hansen)
3. Saxelin M. et al.: The technology of probiotics. Trends in food science and technology, vol. 10, 1991, pages 387-392
4. Martin-Diana A. B. et al.: Development of a fermented goat's milk containing probiotic bacteria. Int. Dairy J., vol. 13, 2003, pages 827-833
5. U.S. Pat. No. 4,588,595 A (Okonogi Shigeo (JP) et al)
6. US 2005/031735 A1 (Serata Masaki (JP) et al)
7. U.S. Pat. No. 4,187,321 A (Mada Mitsuo (JP) et al)
8. U.S. Pat. No. 5,230,912 A (Yajima Masako (JP) et al)

TABLE 3

| Culture | BB-12® inoculation* CFU/mL | BB-12® CFU/mL Day 1 | BB-12® growth during fermentation** | BB-12® CFU/mL Day 42 | BB-12® CFU day 42/ inoc. |
|---|---|---|---|---|---|
| 74 = new culture with CHCC3912 | $1.0 \times 10^7$ | $1.6 \times 10^8$ | 16× | $9.1 \times 10^7$ | 9.1 |
| 68 = new culture with CHCC4462 | $1.0 \times 10^7$ | $1.6 \times 10^8$ | 16× | $8.1 \times 10^7$ | 8.1 |
| 68 Applied in low inoculation | $2.5 \times 10^6$ | $4.7 \times 10^7$ | 19× | $2.2 \times 10^7$ | 8.8 |
| ABY-10 | $5.0 \times 10^6$ | $4.0 \times 10^7$ | 8× | $2.2 \times 10^7$ | 4.4 |
| BY-700 | $6.0 \times 10^6$ | $4.3 \times 10^7$ | 7× | $2.1 \times 10^7$ | 3.5 |

*Calculated according to the product specifications
**Growth during fermentation is calculated as CFU day 1/CFU inoculation All references cited in this patent document are hereby incorporated herein in their entirety by reference.

| | | |
|---|---|---|
| 0-1 | Form PCT/RO/134 (SAFE) Indications Relating to Deposited Microorganism(s) or Other Biological Material (PCT Rule 13bis) | |
| 0-1-1 | Prepared Using | PCT Online Filing Version 3.5.000.204 MT/FOP 20020701/0.20.5.9 |
| 0-2 | International Application No. | |
| 0-3 | Applicant's or agent's file reference | P3442PC00 |
| 1 | The indications made below relate to the deposited microorganism(s) or other biological material referred to in the description on: | |
| 1-1 | page | 8 |
| 1-2 | line | 29 |
| 1-3 | Identification of deposit | |
| 1-3-1 | Name of depositary institution | DSMZ DSMZ-Deutsche Sammlung von Mikroorganismen und Zellkulturen GmbH |
| 1-3-2 | Address of depositary institution | Inhoffenstr. 7B, D-38124 Braunschweig, Germany |
| 1-3-3 | Date of deposit | 23 Apr. 2008 (23.04.2008) |
| 1-3-4 | Accession Number | DSMZ 21406 |
| 1-5 | Designated States for Which Indications are Made | all designations |
| 2 | The indications made below relate to the deposited microorganism(s) or other biological material referred to in the description on: | |
| 2-1 | page | 8 |
| 2-2 | line | 29 |
| 2-3 | Identification of deposit | |
| 2-3-1 | Name of depositary institution | DSMZ DSMZ-Deutsche Sammlung von Mikroorganismen und Zellkulturen GmbH |
| 2-3-2 | Address of depositary institution | Inhoffenstr. 7B, D-38124 Braunschweig, Germany |
| 2-3-3 | Date of deposit | 23 Apr. 2008 (23.04.2008) |
| 2-3-4 | Accession Number | DSMZ 21407 |
| 2-5 | Designated States for Which Indications are Made | all designations |

| | | |
|---|---|---|
| 3 | The indications made below relate to the deposited microorganism(s) or other biological material referred to in the description on: | |
| 3-1 | page | 8 |
| 3-2 | line | 29 |
| 3-3 | Identification of deposit | |
| 3-3-1 | Name of depositary institution | DSMZ DSMZ-Deutsche Sammlung von Mikroorganismen und Zellkulturen GmbH |
| 3-3-2 | Address of depositary institution | Inhoffenstr. 7B, D-38124 Braunschweig, Germany |
| 3-3-3 | Date of deposit | 23 Apr. 2008 (23.04.2008) |
| 3-3-4 | Accession Number | DSMZ 21421 |
| 3-5 | Designated States for Which Indications are Made | all designations |
| 4 | The indications made below relate to the deposited microorganism(s) or other biological material referred to in the description on: | |
| 4-1 | page | 8 |
| 4-2 | line | 29 |
| 4-3 | Identification of deposit | |
| 4-3-1 | Name of depositary institution | DSMZ DSMZ-Deutsche Sammlung von Mikroorganismen und Zellkulturen GmbH |
| 4-3-2 | Address of depositary institution | Inhoffenstr. 7B, D-38124 Braunschweig, Germany |
| 4-3-3 | Date of deposit | 23 Apr. 2008 (23.04.2008) |
| 4-3-4 | Accession Number | DSMZ 21408 |
| 4-5 | Designated States for Which Indications are Made | all designations |

| | FOR RECEIVING OFFICE USE ONLY | |
|---|---|---|
| 0-4 | This form was received with the international application:(yes or no) | Yes |
| 0-4-1 | Authorized officer | Chavrot, Elodie |
| | FOR INTERNATIONAL BUREAU USE ONLY | |
| 0-5 | This form was received by the international Bureau on: | |
| 0-5-1 | Authorized officer | |

The invention claimed is:

1. A method for preparation of a fermented milk product, which comprises:
   i) inoculating milk with
      a) bacteria belonging to a *Bifidobacterium* strain, and
      b) an isolated bacterial strain that (A) is selected from the group consisting of the *Lactococcus lactis* strain CHCC3912 (DSM 21406) and *Streptococcus thermophilus* strain CHCC7018 (DSM 21408) or (B) is a mutant of either CHCC3912 or CHCC7018 that enhances growth of *Bifidobacterium animalis* subspecies *lactis;*
   ii) fermenting the milk;
   iii) optionally adding further microorganisms and/or additives to the fermented milk; and
   iv) optionally packaging the fermented milk product.

2. The method of claim 1, which further comprises inoculating the milk with bacteria belonging to a species selected from the group consisting of: *Lactobacillus bulgaricus, Streptococcus thermophilus, Lactococcus lactis*, and *Lactobacillus acidophilus*.

3. The method of claim 1, wherein step i) comprises inoculating milk with a culture comprising:
   a) a *Bifidobacterium* strain;
   b) a *Lactobacillus bulgaricus* strain; and
   c) an isolated bacterial strain that (A) is selected from the group consisting of the *Lactococcus lactis* strain CHCC3912 (DSM 21406) and *Streptococcus thermophilus* strain CHCC7018 (DSM 21408) or (B) is a mutant of either CHCC3912 or CHCC7018 that enhances growth of *Bifidobacterium animalis* subspecies lactis.

4. The method of claim 1, wherein the *Bifidobacterium* strain is *Bifidobacterium animalis*.

5. The method of claim 1, wherein the *Bifidobacterium strain* is selected from the group consisting of CHCC5445 (DSM15954), CHCC7158 (DSM17280), and DSM15955.

6. The method of claim 1, wherein the fermented milk product contains at least $10^8$ cfu/g Bifidobacteria after 28 days of storage at +6° C.

7. The method of claim 1, wherein the milk in step i) is inoculated with $10^5$ to $3\times10^7$ cfu/g of the *Bifidobacterium* and/or with $10^4$ to $3.5\times10^6$ cfu/g of the *Streptococcus thermophilus* or *Lactococcus lactis* bacteria.

8. The method of claim 1, wherein the fermented milk product is packaged in a sealed package that contains from 10 ml to 5000 ml.

9. A fermented milk product obtainable by the method of claim 1.

10. A fermented milk product of claim 9, which product contains at least $10^8$ cfu/g Bifidobacteria after 28 days of storage at +6° C.

11. A fermented milk product comprising an isolated bacterial strain that (A) is selected from the group consisting of the *Lactococcus lactis* strain CHCC3912 (DSM 21406) and *Streptococcus thermophilus* strain CHCC7018 (DSM 21408) or (B) is a mutant of either CHCC3912 or CHCC7018 that enhances growth of *Bifidobacterium animalis* subspecies *lactis.*

12. The fermented milk product of claim 1, which comprises at least $10^3$ cfu/g of the *Streptococcus thermophilus* strain.

13. A composition comprising:
   a) bacteria belonging to a *Bifidobacterium* strain CHCC5445 (DSM15954), and
   b) an isolated bacterial strain that (A) is selected from the group consisting of the *Lactococcus lactis* strain CHCC3912 (DSM 21406) and *Streptococcus thermophilus* strain CHCC7018 (DSM 21408) or (B) is a mutant of either CHCC3912 or CHCC7018 that enhances growth of *Bifidobacterium animalis* subspecies lactis.

14. An isolated bacterial strain that (A) is selected from the group consisting of the *Lactococcus lactis* strain CHCC3912 (DSM 21406) and *Streptococcus thermophilus* strain CHCC7018 (DSM 21408) or (B) is a mutant of either CHCC3912 or CHCC7018 that enhances growth of *Bifidobacterium animalis* subspecies *lactis*.

15. An isolated bacterial strain that is selected from the group consisting of the *Lactococcus lactis* strain CHCC3912 (DSM 21406) and *Streptococcus thermophilus* strain CHCC7018 (DSM 21408).

16. The method of claim 1, wherein the isolated bacterial strain is selected from the group consisting of the *Lactococcus lactis* strain CHCC3912 (DSM 21406) and *Streptococcus thermophilus* strain CHCC7018 (DSM 21408).

17. The fermented milk product of claim 11, wherein the isolated bacterial strain is selected from the group consisting of the *Lactococcus lactis* strain CHCC3912 (DSM 21406) and *Streptococcus thermophilus* strain CHCC7018 (DSM 21408).

18. The composition of claim 13, wherein the isolated bacterial strain is selected from the group consisting of the *Lactococcus lactis* strain CHCC3912 (DSM 21406) and *Streptococcus thermophilus* strain CHCC7018 (DSM 21408).

* * * * *

UNITED STATES PATENT AND TRADEMARK OFFICE
CERTIFICATE OF CORRECTION

| | | |
|---|---|---|
| PATENT NO. | : 8,628,763 B2 | Page 1 of 1 |
| APPLICATION NO. | : 13/057461 | |
| DATED | : January 14, 2014 | |
| INVENTOR(S) | : Ditte Marie Folkenberg et al. | |

It is certified that error appears in the above-identified patent and that said Letters Patent is hereby corrected as shown below:

Title Page, Item (54) and in the Specification, Column 1, lines 1 and 2, the Title should read as:

--GROWTH OF BIFIDOBACTERIA IN FERMENTED MILK PRODUCTS--

Signed and Sealed this
Seventeenth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO.         : 8,628,763 B2                                                                 Page 1 of 1
APPLICATION NO. : 13/057461
DATED              : January 14, 2014
INVENTOR(S)        : Folkenberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 179 days.

Signed and Sealed this
Twenty-second Day of September, 2015

Michelle K. Lee
*Director of the United States Patent and Trademark Office*